(12) United States Patent
Suzuki et al.

(10) Patent No.: US 11,099,022 B2
(45) Date of Patent: *Aug. 24, 2021

(54) VEHICLE REACH AREA PRESENTATION DEVICE AND VEHICLE REACH AREA PRESENTATION METHOD

(71) Applicant: Nissan Motor Co., Ltd., Kanagawa (JP)

(72) Inventors: Masayasu Suzuki, Kanagawa (JP); Hirofumi Inoue, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 202 days.

This patent is subject to a terminal disclaimer.

(21) Appl. No.: 16/395,427

(22) Filed: Apr. 26, 2019

(65) Prior Publication Data

US 2019/0250004 A1  Aug. 15, 2019

Related U.S. Application Data

(63) Continuation of application No. 15/580,841, filed as application No. PCT/JP2015/066539 on Jun. 9, 2015, now Pat. No. 10,317,228.

(51) Int. Cl.
| | |
|---|---|
| *G01C 21/34* | (2006.01) |
| *G06Q 10/04* | (2012.01) |
| *B60W 50/14* | (2020.01) |
| *G01C 21/30* | (2006.01) |
| *G06Q 50/30* | (2012.01) |
| *G01C 21/36* | (2006.01) |

(52) U.S. Cl.
CPC ...... *G01C 21/3469* (2013.01); *G01C 21/3676* (2013.01); *G06Q 10/04* (2013.01); *G06Q 50/30* (2013.01); *B60L 2240/60* (2013.01); *B60L 2260/52* (2013.01); *B60L 2260/54* (2013.01); *B60W 2050/146* (2013.01)

(58) Field of Classification Search
USPC ........................................................ 701/31.4
See application file for complete search history.

(56) References Cited

U.S. PATENT DOCUMENTS

| | | |
|---|---|---|
| 5,568,390 A | 10/1996 | Hirota et al. |
| 6,334,344 B1 | 1/2002 | Bonhoure et al. |
| (Continued) | | |

FOREIGN PATENT DOCUMENTS

| | | |
|---|---|---|
| EP | 2789977 A1 | 10/2014 |
| JP | 2009-025128 A | 2/2009 |
| (Continued) | | |

*Primary Examiner* — Tyler D Paige
(74) *Attorney, Agent, or Firm* — Osha Bergman Watanabe & Burton LLP

(57) ABSTRACT

A vehicle reach area presentation device sets a unit area in which a start point exists as a start area among unit areas into which a region on map data is divided and extracts pieces of probe data including records of past travels within a certain range from the start area. The device sets the unit areas, including goal points recorded in the extracted pieces of probe data, as reach areas, calculates energy consumptions from the start area to the reach areas by using the pieces of probe data, and presents the reach areas to a user while changing display of the reach areas depending on the calculated energy consumptions.

20 Claims, 10 Drawing Sheets

(56) References Cited

U.S. PATENT DOCUMENTS

| | | | |
|---|---|---|---|
| 7,778,769 B2 | 8/2010 | Boss et al. | |
| 8,417,401 B2 | 4/2013 | Takahara et al. | |
| 8,612,082 B2 | 12/2013 | Hashimoto et al. | |
| 8,700,244 B2 | 4/2014 | Fukuda et al. | |
| 8,712,677 B2 * | 4/2014 | Miura | G01C 21/00 701/123 |
| 9,046,379 B2 | 6/2015 | Mineta | |
| 9,308,827 B2 | 4/2016 | Kobayashi et al. | |
| 10,317,228 B2 * | 6/2019 | Suzuki | G01C 21/3676 |
| 2003/0006914 A1 * | 1/2003 | Todoriki | B60L 53/64 340/995.21 |
| 2003/0033083 A1 | 2/2003 | Nakashima et al. | |
| 2007/0262855 A1 * | 11/2007 | Zuta | G01F 1/663 340/439 |
| 2008/0294339 A1 * | 11/2008 | Tauchi | G01C 21/3469 701/455 |
| 2010/0138098 A1 | 6/2010 | Takahara et al. | |
| 2011/0087390 A1 | 4/2011 | Pandit et al. | |
| 2011/0166773 A1 * | 7/2011 | Raz | G07C 5/085 701/123 |
| 2011/0208428 A1 * | 8/2011 | Matsubara | G01C 21/367 701/532 |
| 2012/0035843 A1 * | 2/2012 | Miura | G01C 21/3697 701/123 |
| 2012/0116606 A1 | 5/2012 | Ichinokawa | |
| 2012/0179365 A1 * | 7/2012 | Miyahara | G01C 21/3617 701/428 |
| 2013/0131892 A1 | 5/2013 | Hashimoto et al. | |
| 2013/0218366 A1 | 8/2013 | Fukuda et al. | |
| 2013/0325309 A1 | 12/2013 | Lange | |
| 2014/0074390 A1 | 3/2014 | Williams et al. | |
| 2014/0203077 A1 | 7/2014 | Gadh et al. | |
| 2014/0244110 A1 | 8/2014 | Tharaldson et al. | |
| 2014/0303826 A1 | 10/2014 | Kobayashi et al. | |
| 2014/0379183 A1 | 12/2014 | Long | |
| 2015/0051825 A1 | 2/2015 | Saavedra | |
| 2016/0003621 A1 | 1/2016 | Koenig et al. | |
| 2016/0311423 A1 * | 10/2016 | Storm | B60W 20/12 |
| 2016/0357187 A1 * | 12/2016 | Ansari | G01S 13/862 |
| 2018/0340783 A1 * | 11/2018 | Suzuki | G01C 21/3469 |

FOREIGN PATENT DOCUMENTS

| | | |
|---|---|---|
| JP | 2011-217509 A | 10/2011 |
| JP | 2012-032256 A | 2/2012 |
| JP | 5158183 B2 | 3/2013 |
| JP | 2013-068520 A | 4/2013 |
| JP | 2014-106068 A | 6/2014 |
| WO | 2013/084931 A1 | 6/2013 |
| WO | 2014/080506 A1 | 5/2014 |
| WO | 2014/080535 A1 | 5/2014 |

* cited by examiner (a)

(b)

VEHICLE REACH AREA PRESENTATION DEVICE AND VEHICLE REACH AREA PRESENTATION METHOD

BACKGROUND

Technical Field

The present invention relates to a vehicle reach area presentation device and a method for the same which present areas reachable by a vehicle to a user by dividing a region on map data into predetermined unit areas and retrieving pieces of probe data.

Related Art

Patent Literature 1 discloses a necessary power estimation device as a conventional device for estimating a power consumption of a vehicle. The necessary power estimation device sets a reference power consumption for each of sections by using a reference vehicle actually travelling on roads, and estimates a power consumption amount necessary for a vehicle to reach a destination by using the reference power consumptions and a correction amount set on a vehicle-by-vehicle basis.
Patent Literature 1: Japanese Patent No. 5158183

SUMMARY OF INVENTION

However, the conventional necessary power estimation device described above performs the estimation under the conditions where the destination is set and a travel route of the vehicle is determined. Accordingly, the conventional necessary power estimation device cannot meet the needs of users who desire to know how far their vehicles can travel without setting the destinations.

One or more embodiments of the present invention provides a vehicle reach area presentation device and a method for the same which allow a user to know how far his/her vehicle can travel without setting a destination.

A vehicle reach area presentation device and a vehicle reach area presentation method in accordance with one or more embodiments of the present invention obtains a start point of a vehicle inputted by a user and set a unit area in which the start point exists as a start area. The device and method extract pieces of probe data including records of past travels within a certain range from the start area, set the unit areas, including goal points recorded in the extracted pieces of probe data, as reach areas, an calculate energy consumptions from the start area to the reach areas by using the pieces of probe data. From the results, the device and method present the reach areas to the user while changing display of the reach areas depending on the calculated energy consumptions.

DETAILED DESCRIPTION

Embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that, in the following embodiments, description is given of the case where a vehicle is an electric car. However, one or more embodiments of the present invention can be applied also to a vehicle other than the electric car such as a gasoline car. Accordingly, although an energy consumption is described as a power consumption in the embodiments, this may be replaced by a fuel consumption in a vehicle other than the electric car.

Figure 1:
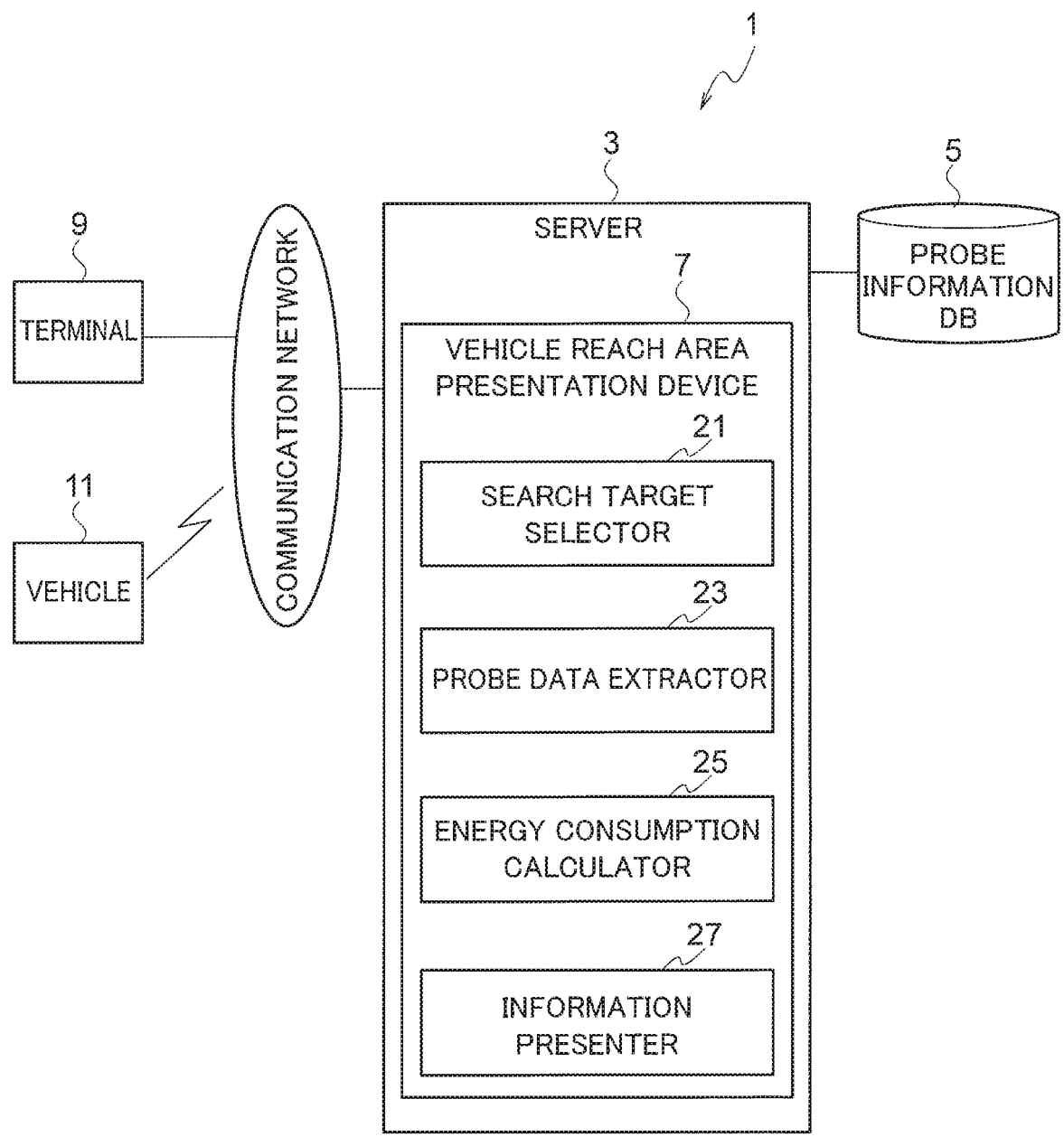
FIG. 1 is a block diagram illustrating a configuration of a vehicle reach area presentation system according to a first embodiment of the present invention.

First Embodiment (Configuration of Vehicle Reach Area Presentation System) FIG. 1 is a block diagram illustrating a configuration of a vehicle reach area presentation system including a vehicle reach area presentation device of a first embodiment. As illustrated in FIG. 1, the vehicle reach area presentation system 1 according to the first embodiment includes a server 3, a probe information database 5, a vehicle reach area presentation device 7, a terminal 9, and a vehicle 11.

The vehicle reach area presentation system 1 is a system utilizing a probe car system which provides services by collecting pieces of probe data from many vehicles.

The server 3 is a probe server installed in a data center of the probe car system and collects the pieces of probe data from many vehicles to store them in the probe information database 5.

The probe information database 5 stores the pieces of probe data collected by the server 3 and also stores information necessary in processing performed by the vehicle reach area presentation device 7. For example, the probe information database 5 stores user information, characteristic information, information on registered user vehicles, and the like.

The vehicle reach area presentation device 7 is a device installed in the server 3. The vehicle reach area presentation device 7 presents areas reachable by a vehicle to each of users by dividing a region on map data into predetermined unit areas and retrieving the pieces of probe data stored in the probe information database 5.

The terminal 9 is a device which can access the server 3 via a communication network such as the Internet and is, for example, a personal computer installed in the home of the user, a smartphone of the user, or the like. Necessary applications are installed in the terminal 9, and it is possible to input necessary information into the vehicle reach area presentation device 7 from the terminal 9 and display information presented by the vehicle reach area presentation device 7 on the terminal 9.

The vehicle 11 is capable of accessing the server 3 via the communication network by means of radio communication, and the user can input necessary information into the vehicle reach area presentation device 7 by using a display panel of a navigation device or the like. Moreover, the vehicle 11 can display information presented by the vehicle reach area presentation device 7 on the display panel.

In this example, the vehicle reach area presentation device 7 includes a search target selector 21, a probe data extractor 23, an energy consumption calculator 25, and an information presenter 27.

The search target selector 21 obtains the user information inputted by each user to specify the user and searches the probe information database 5 to specify the user vehicle registered by the user. Then, the search target selector 21 obtains the characteristic information indicating the characteristics of the user and the user vehicle from the pieces of probe data and selects users and vehicles having characteristics similar to the obtained characteristic information as search targets. Specifically, the search target selector 21 obtains power economy (consumption rate of power, corresponding to fuel economy of a gasoline car), a regeneration ratio, a battery degradation degree, and the like from the pieces of probe data as the characteristic data and selects the users and vehicles with similar values as the search targets.

The probe data extractor 23 obtains a start point of the vehicle inputted by the user, sets a unit area in which the start point exists as a start area, and extracts the pieces of probe data including records of past travels within a certain range from the start area. Specifically, the probe data extractor 23 extracts the pieces of probe data including records of past travels with start points, goal points, and the like within a certain range from the start area. Moreover, the probe data extractor 23 may extract only the pieces of probe data relating to the users and vehicles selected as the search targets by the search target selector 21. Furthermore, the probe data extractor 23 may extract the pieces of probe data matching conditions related to a travel environment set by the user. The conditions related to the travel environment includes, for example, the time of the year, the time of the day, the weather, the air temperature, presence or absence of traffic jam, and the like.

The energy consumption calculator 25 sets unit areas, including the goal points recorded in the pieces of probe data extracted by the probe data extractor 23, as reach areas, and calculates a power consumption from the start area to each reach area by using the extracted pieces of probe data. Specifically, the energy consumption calculator 25 retrieves the pieces of probe data of travels from the start area to each reach area, from the extracted pieces of probe data. Then, the energy consumption calculator 25 calculates the power consumption from the start area to the reach area by using the power consumptions recorded in the retreated pieces of probe data. The power consumption calculated herein may be an average, a median, a maximum value, a minimum value, or the like and, in the first embodiment, the energy consumption calculator 25 calculates the average power consumption.

The information presenter 27 presents the reach areas to the user while changing display of the reach areas depending on the power consumptions calculated by the energy consumption calculator 25. Specifically, in the first embodiment, the information presenter 27 displays the reach areas while changing the colors of the reach areas depending on the power consumptions. Moreover, the information presenter 27 may change the display of the reach areas depending on the state of the user vehicle. For example, the information presenter 27 may change the display of the reach areas in consideration of the current state of charge of the user vehicle.

Note that the vehicle reach area presentation device 7 consists of a general-purpose electronic circuit including a microcomputer, a microprocessor, and a CPU and peripheral devices such as a memory. The vehicle reach area presentation device 7 operates as the search target selector 21, the probe data extractor 23, the energy consumption calculator 25, and the information presenter 27 by executing specific programs.

(Steps of Vehicle Reach Area Presentation Processing)

Next, steps of vehicle reach area presentation processing performed by the vehicle reach area presentation device 7 according to the first embodiment are described with reference to the flowchart of FIG. 2.

Figure 2:
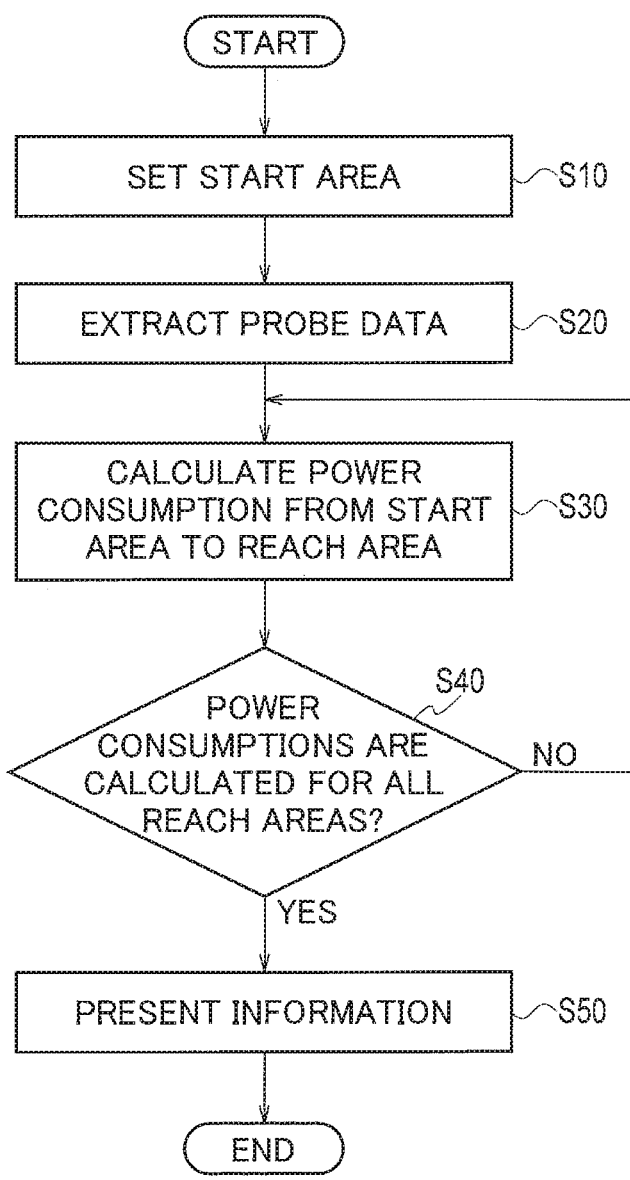
FIG. 2 is a flowchart chart illustrating processing steps in vehicle reach area presentation processing performed by a vehicle reach area presentation device according to the first embodiment of the present invention.

As illustrated in FIG. 2, in step S10, when the user inputs the start point on the terminal 9 or the vehicle 11, the probe data extractor 23 obtains the inputted start point. Then, the probe data extractor 23 sets the unit area in which the start point exists among the unit areas obtained by dividing the region on the map in a mesh pattern, as the start area.

In this case, the user may input a user ID on the terminal 9 or the vehicle 11 as the user information. When the user ID is inputted, the search target selector 21 specifies the user by using the inputted user ID and also searches the probe information database 5 to specify the user vehicle registered by the user.

Next, in step S20, the probe data extractor 23 extracts the pieces of probe data including the records of past travels within a certain range from the thus-set start area. For example, the probe data extractor 23 extracts the pieces of probe data including the records of past travels within a predetermined range of about 200 to 300 km from the start area. The records of past travels only need to include the start points and the goal points.

Figure 3:
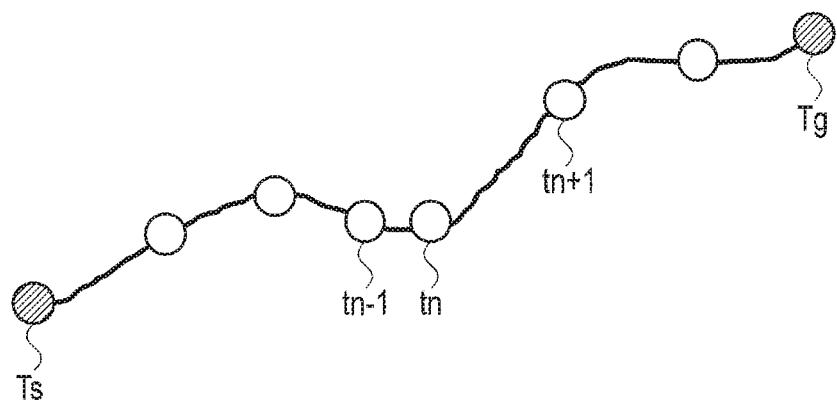
FIG. 3 is a view for explaining a piece of probe data extracted by the vehicle reach area presentation device according to the first embodiment of the present invention.

The probe data includes trip data and point sequence data. As illustrated in FIG. 3, the trip data is data recording a start point Ts at which an ignition switch of the vehicle is turned on and a goal point Tg at which the ignition switch is turned off. Meanwhile, the point sequence data is data of the vehicle obtained every predetermined time, for example, every 30 seconds, and is data obtained at each time point tn during the travel from the start point Ts to the goal point Tg as illustrated in FIG. 3.

Specifically, the trip data can be expressed as $$D\text{total} = \{\text{start point}, \text{start time}, \text{goal point}, \text{goal time}, \text{total travel distance}, \text{total power consumption}\}.$$

Here, the start point is the latitude and longitude of the point where the ignition switch of the vehicle is turned on and the start time is the time of this turn-on. The goal point is the latitude and longitude of the point where the ignition switch of the vehicle is turned off and the goal time is the time of this turn-off. The total travel distance and the total power consumption are the travel distance and power consumption in a period from the turn-on to the turn-off of the ignition switch of the vehicle.

Moreover, the point sequence data can be expressed as $$Dtn=\{\text{time } tn, \text{latitude-longitude } tn, \text{travel distance } tn, \text{power consumption } tn\}.$$

Here, the time tn is the time at a time point tn, the latitude-longitude tn is the position (latitude, longitude) of the vehicle at the time point tn, the travel distance tn is the travel distance in a period from tn−1 to tn, and the power consumption tn is the power consumption in the period from tn−1 to tn. Note that the probe data includes, in addition to the aforementioned information, other information such as information on the travel environment and information on the user and the vehicle.

In the extraction of the pieces of probe data, only the pieces of probe data relating to the users and vehicles selected as the search targets by the search target selector 21 may be extracted. When the user and the user vehicle are specified in step S10, the search target selector 21 obtains the characteristic information indicating the characteristics of the user and the user vehicle from the pieces of probe data and selects the users and vehicles having characteristics similar to the obtained characteristic information as the search targets.

Specifically, the search target selector 21 obtains the power economy and the regeneration ratio as the characteristic information of the user and obtains the battery degradation degree as the characteristic information of the user vehicle. The power economy varies greatly between a user who bears in mind economical driving and a user who performs aggressive driving, and thus can be utilized as the characteristic information indicating the drive characteristic of the user. Similarly, the regeneration ratio varies between a user who stops by braking and a user who coasts and stops by slightly applying the brake, and thus can be utilized as the characteristic information indicating the drive characteristic of the user. Moreover, since the capacity of the battery in a fully-charged state decreases when the battery degrades, the battery degradation degree can be utilized as the characteristic information indicating the state of the vehicle. Among these pieces of information, the power economy and the regeneration ratio are calculated for each trip and stored as the piece of probe data in advance, and can be thus obtained from the probe information database 5. Moreover, the battery degradation degree can be obtained from, for example, a value of information obtained from a battery controller of the vehicle and stored as the piece of probe data.

After obtaining the characteristic information as described above, the search target selector 21 selects the users and vehicles having characteristics similar to the obtained characteristic information as the search targets. For example, the search target selector 21 selects users and vehicles whose power economy, regeneration ratio, and battery degradation degree are within a range of −10% to +10% of those in the characteristic information, as the search targets. Alternatively, the configuration may be such that each of the power economy, the regeneration ratio, and the battery degradation degree is divided into three levels of a level around the average, a level higher than the average, and a level lower than the average and users and vehicles in the same level are selected as the search targets. The search target selector 21 thereby selects the users and vehicles having characteristics similar to the characteristics of the user and the user vehicle, as the targets to be retrieved.

Then, the probe data extractor 23 extracts only the pieces of probe data relating to the users and vehicles selected as the search targets. This enables extraction of only the pieces of probe data relating to characteristics similar to the characteristics of the user and the user vehicle.

Moreover, the probe data extractor 23 may extract pieces of probe data matching the conditions relating to the travel environment set by the user. The conditions relating to the travel environment include the time of the year, the time of the day, the weather, the air temperature, and the presence of absence of traffic jam. When the user sets these conditions, the probe data extractor 23 extracts the pieces of probe data matching these conditions. For example, when the condition that the weather is rainy is set, only the pieces of probe data relating to rainy days are extracted.

Figure 4:
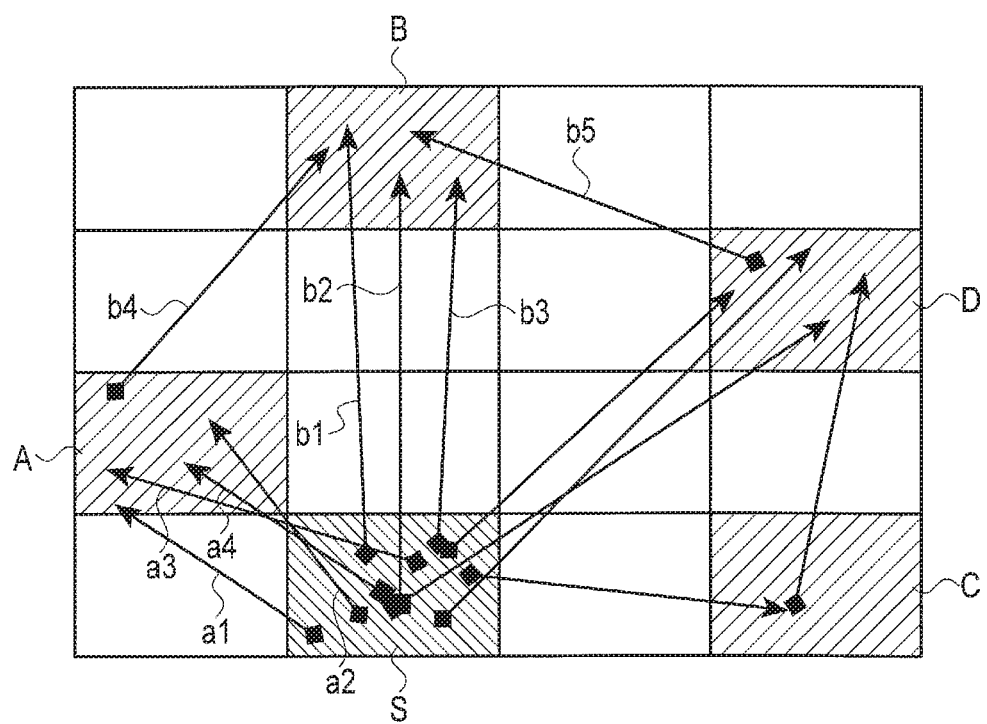
FIG. 4 is a view for explaining a method of calculating an energy consumption performed by the vehicle reach area presentation device according to the first embodiment of the present invention.

Next, in step S30, the energy consumption calculator 25 sets the unit areas, including the goal points recorded as the travel records in the pieces of probe data extracted in step S20, as the reach areas. For example, as illustrated in FIG. 4, the region on the map is divided into unit areas of a mesh pattern and the pieces of probe data extracted when the start area S is set are illustrated by arrows. In other words, each piece of probe data is illustrated by drawing an arrow from the start point to the goal point of the piece of probe data. In FIG. 4, the unit areas in which tips of the arrows are located are four unit areas of A, B, C, and D, and the reach areas are thus A, B, C, and D.

When the reach areas are set, the energy consumption calculator 25 calculates the energy consumption from the start area to each reach area by using the extracted pieces of probe data. Specifically, the energy consumption calculator 25 retrieves the pieces of probe data of travels from the start area and to each reach area, from the extracted pieces of probe data. Then, the energy consumption calculator 25 calculates the power consumption from the start area to the reach area by using the power consumptions recorded in the retrieved pieces of probe data. The power consumption calculated herein may be the average, the median, the maximum value, the minimum value, or the like and, in the first embodiment, the energy consumption calculator 25 calculates the average power consumption. In this case, first, the power consumption from the start area to each reach area is calculated by using only the pieces of probe data of the travels from the start area to the reach area. For example, as illustrated in FIG. 4, the pieces of probe data of the travels from the start point S to the reach area B are b1, b2, and b3. Thus, the energy consumption calculator 25 calculates the average power consumption from the power consumptions recorded in the pieces of probe data b1 to b3. This average power consumption is set as the power consumption to the reach area B.

Moreover, the energy consumption calculator 25 may connect multiple pieces of probe data relating to the same user from the start area to the reach area and calculate the energy consumption from the start area to the reach area. For example, as illustrated in FIG. 4, a vehicle can reach the reach area B from the start point S via the reach area A. In this case, the pieces of probe data of travels from the start area S to the reach area A are a1, a2, a3, and a4, and the piece of probe data of a travel from the reach area A to the reach area B is b4. Accordingly, the power consumption in the travel from the start area S to the reach area B via the reach area A can be calculated by detecting any of the pieces of probe data a1 to a4 relating to the same user as that of the piece of probe data b4 and by connecting the detected piece of probe data with the piece of probe data b4. Then, the average power consumption to the reach area B is calculated from the power consumption to the reach area B via the reach area A. Such an operation is performed in consideration of the case where the user has reached a destination by temporarily turning off the ignition en route to the destination at a store or a charging station and then starting to travel again.

Furthermore, the energy consumption calculator 25 may calculate the energy consumption from the start area to the reach area by connecting the pieces of probe data relating to multiple users from the start area to the reach area. Such an operation is performed in consideration of the case where the number of the extracted pieces of probe data is small, the case where the pieces of probe data relating to the same user cannot be connected, or similar cases. For example, when none of the pieces of probe data a1 to a4 relates to the same user as that of the piece of probe data b4, the power consumption to the reach area B via the reach area A may be calculated by connecting the piece of probe data b4 with one of the pieces of probe data a1 to a4.

Note that the energy consumption calculator 25 does not connect the pieces of probe data when the distance calculated by using the pieces of probe data from the start area to the reach area is longer than the linear distance from the start area to the reach area by a predetermined distance or more. For example, as illustrated in FIG. 4, the vehicle can reach the reach area B from the start area S via the reach area C and the reach area D. However, when the distance is too long, the power consumption cannot be accurately calculated. Accordingly, when the travel distances recorded in all of the connected pieces of probe data are added up and the resultant value is larger than the linear distance from the start area to the reach area by the predetermined distance or more, for example, the resultant value is equal to or more than 1.2 times to 1.5 times the linear distance, the energy consumption calculator 25 does not connect the pieces of probe data.

In step S40, the energy consumption calculator 25 determines whether the power consumptions are calculated for all reach areas. Then, when the power consumptions are not calculated for all reach areas, the processing returns to step S30. When the power consumptions are calculated for all reach areas, the processing proceeds to step S50.

Figure 5:
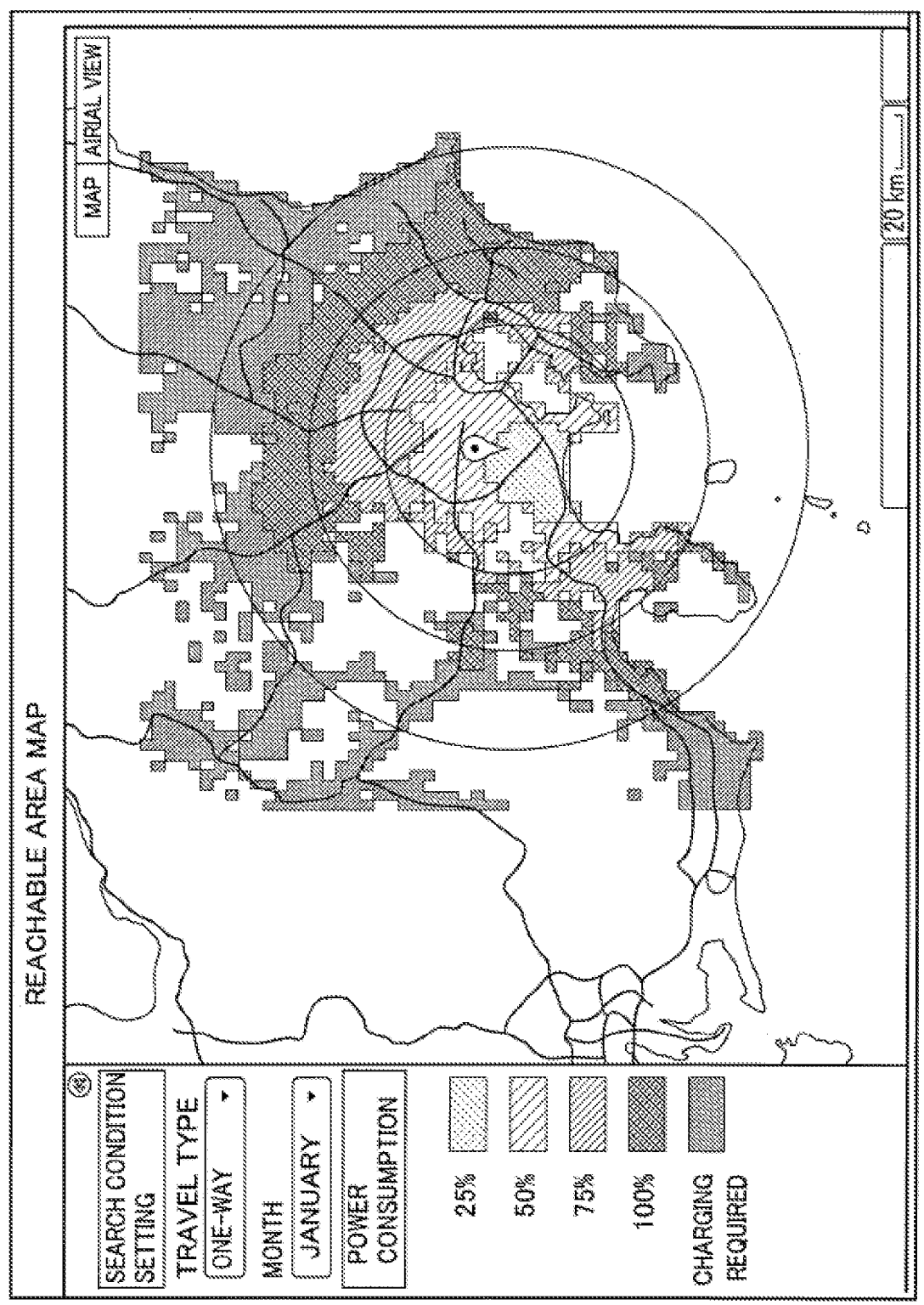
FIG. 5 is a view illustrating an example of display presented by the vehicle reach area presentation device according to the first embodiment of the present invention.

In step S50, the information presenter 27 presents the reach areas to the user while changing the display of the reach areas depending on the power consumptions calculated in step S30. Specifically, in the first embodiment, the reach areas are displayed while changing the colors of the reach areas depending on the calculated power consumptions. For example, as illustrated in FIG. 5, the information presenter 27 calculates the percentage of each calculated power consumption relative to the power in the fully-charged state and displays the reach areas on the map while color-coding the reach areas depending on the percentage. For example, the reach areas travel to which requires a power consumption of 100% relative to the power in the fully-charged state are displayed to be color coded in red, the reach areas travel to which requires a power consumption of 75% are displayed to be color coded in orange, the reach areas travel to which requires a power consumption of 50% are displayed to be color coded in yellow, and the reach areas travel to which requires a power consumption of 25% are displayed to be color coded in yellow-green. Furthermore, the reach areas travel to which requires a power consumption exceeding the power in the fully-charged state are also displayed as "charge required" in FIG. 5 as areas reachable provided that charging is to be performed on the way.

Furthermore, when the user accesses the server 3 from the vehicle 11, the information presenter 27 may obtain the state of the vehicle 11 which is the user vehicle and change the display of the reach areas depending on the state of the vehicle 11. For example, the information presenter 27 may obtain the current state of charge of the user vehicle to calculate the percentage of each calculated power consumption relative to the current state of charge, and color code the reach areas.

When the information as illustrated in FIG. 5 is displayed on a display screen of the terminal 9 or a display panel of the vehicle 11 and presented to the user as described above, the vehicle reach area presentation processing according to the first embodiment is terminated.

As described above in detail, the vehicle reach area presentation device 7 according to one or more embodiments of the present invention extracts the pieces of probe data including the records of past travels within a certain range from the start area, and sets the unit areas, including the goal points recorded in the extracted pieces of probe data, as the reach areas. Then, the vehicle reach area presentation device 7 calculates the power consumptions from the start area to the reach areas by using the pieces of probe data and presents the reach areas to the user while changing the display of the reach areas depending on the calculated power consumptions. This allows the user to recognize how far his/her vehicle can travel without setting the destination.

Specifically, the reachable areas of the host vehicle have been conventionally displayed by displaying concentric circles indicating a travelable distance in the fully-charged state on the map. However, since many conditions such as presence or absence of traffic jam, a road gradient, and use or non-use of an air conditioner affect the travelable distance in practice, the vehicle can rarely travel the travelable distance in the fully-charged state, and the user has to travel while worrying about how far the vehicle can actually travel. Meanwhile, the vehicle reach area presentation device 7 according to one or more embodiments of the present invention extracts the pieces of probe data including the records of past travels within a certain range from the start area, and calculates the power consumption from the start area to the reach areas by using the extracted pieces of probe data. This means that the power consumptions are calculated from the actual travel records, and the power consumptions can be thus calculated from data including various conditions such as the traffic jam, the road gradient, and the use of the air conditioner. Hence, it is possible to improve the reliability of the calculated power consumptions and provide a high level of reassurance to the user.

Furthermore, in the vehicle reach area presentation device 7 according to one or more embodiments of the present invention, since the region on the map data is divided into the predetermined unit areas, it is possible to not only facilitate the viewing of the display but also reduce the computation amount. Moreover, since the vehicle reach area presentation device 7 according to one or more embodiments of the present invention presents the reach areas to the user while changing the display of the reach areas depending on the calculated power consumptions, the user can easily understand how far the vehicle can reach by consuming how much power.

Moreover, the vehicle reach area presentation device 7 according to or more embodiments of the present invention calculates the power consumption from the start area to each reach area by using only the pieces of probe data of travels from the start area to the reach area. An accurate power consumption between the start area and the reach area can be thereby calculated.

Furthermore, the vehicle reach area presentation device 7 according to one or more embodiments of the present invention calculates the power consumption from the start area to each reach area by connecting multiple pieces of probe data relating to the same user from the start area to the reach area. This enables calculation of the power consumption also in the case where the user takes a side trip in the middle, and the power consumption can be thereby calculated by using more pieces of probe data.

Moreover, the vehicle reach area presentation device 7 according to one or more embodiments of the present invention calculates the power consumption from the start area to each reach area by connecting multiple pieces of probe data relating to multiple users from the start area to the reach area. This enables calculation of the power consumption also in the case where the number of extracted pieces of probe data is small.

Furthermore, the vehicle reach area presentation device 7 according to one or more embodiments of the present invention does not connect the pieces of probe data when the distance from the start area to the reach area calculated by using the pieces of probe data is longer than the linear distance from the start area to the reach area by the predetermined distance or more. This can prevent the distance from the start area to the reach area from becoming too long due to the connection of the pieces of probe data, and prevent a decrease in the reliability of the calculated power consumption.

Moreover, the vehicle reach area presentation device 7 according to one or more embodiments of the present invention obtains the characteristic information indicating the characteristics of the user and the user vehicle from the pieces of probe data and extracts only the pieces of probe data relating to the users and vehicles having characteristics similar to the characteristics of the characteristic information. This enables calculation of the power consumption based on the pieces of probe data relating to characteristics similar to the characteristics of the user and the user vehicle. Accordingly, it is possible to improve the reliability of the calculated power consumption and provide a high level of reassurance to the user.

Furthermore, since the vehicle reach area presentation device 7 according to one or more embodiments of the present invention extracts the pieces of probe data matching the conditions related to the travel environment set by the user, the power consumptions in the travel environment expected by the user can be calculated.

Moreover, since the vehicle reach area presentation device 7 according to one or more embodiments of the present invention changes the display of the reach areas depending on the state of the user vehicle registered by the user, it is possible to present information depending on the state of the user vehicle and provide a high level of reassurance to the user.

Second Embodiment

Next, a vehicle reach area presentation device according to a second embodiment of the present invention is described with reference to the drawings. Note that, since the configuration of the vehicle reach area presentation system according to the second embodiment is similar to the first embodiment, detailed description thereof is omitted.

(Steps of Vehicle Reach Area Presentation Processing)

Steps of vehicle reach area presentation processing according to the second embodiment are described with reference to the flowchart of FIG. 6. This second embodiment is different from the first embodiment in that, although the power consumption in a one-way travel from the start area to each reach area is calculated in the first embodiment, steps S32, S34 are added in the second embodiment to enable calculation of the power consumption in a round travel. Note that, since the steps other than the added steps S32, S34 are similar to the first embodiment described in FIG. 2, detailed description thereof is omitted.

Figure 6:
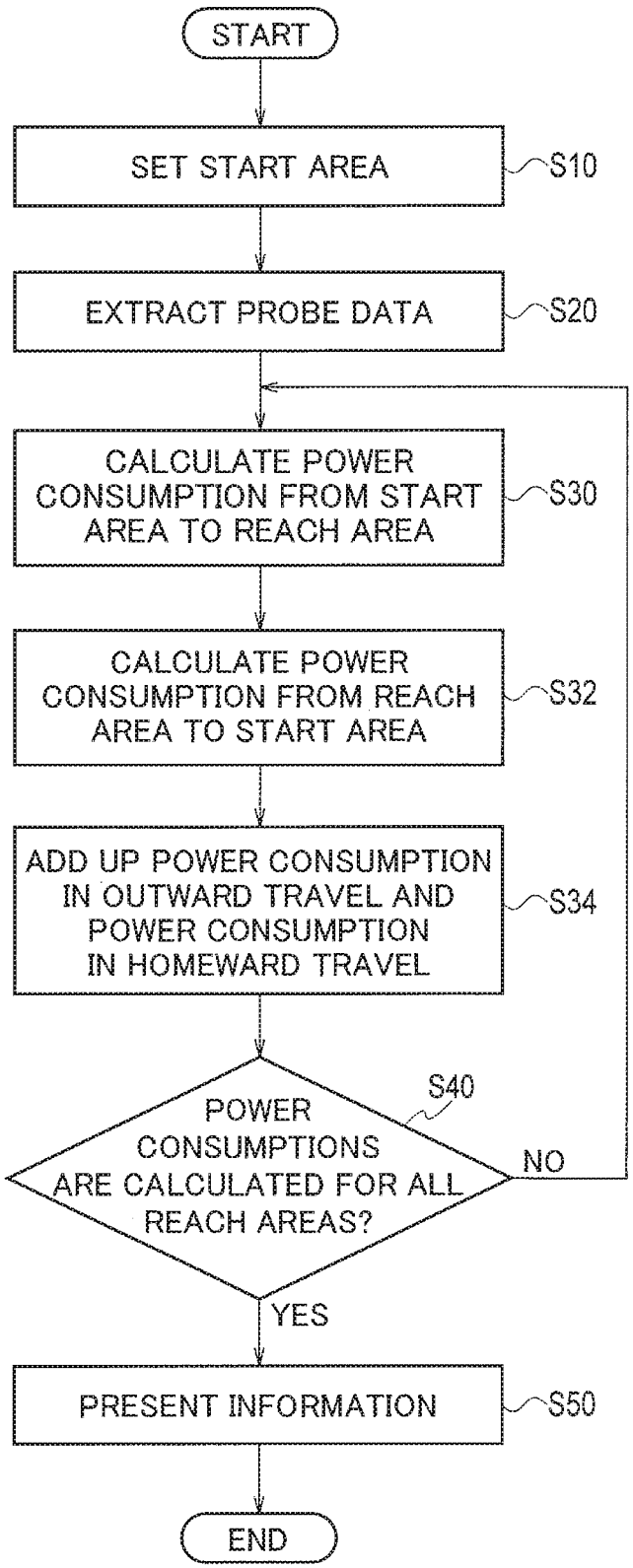
FIG. 6 is a flowchart illustrating processing steps in vehicle reach area presentation processing performed by a vehicle reach area presentation device according to a second embodiment of the present invention.

As illustrated in FIG. 6, after the power consumption from the start area to each reach area, that is a power consumption in an outward travel is calculated in step S30, the processing proceeds to step S32 and a power consumption from the reach area to the start area, that is a power consumption in a homeward travel is calculated.

In step S32, the probe data extractor 23 extracts the pieces of probe data including the start point in the reach area the power consumption to which is calculated in step S30 and including the goal point in the start area set in step S10. Specifically, the probe data extractor 23 extracts the pieces of probe data relating to vehicles starting from the reach area and travelling to the start area. In the calculation of the power consumption in the round travel, the power consumption obtained by simply doubling the power consumption in the outward travel may differ from the power consumption in the actual travel. For example, when the elevation of the reach area is high, the power consumption in the outward travel is high but the power consumption in the homeward travel is low. Accordingly, also in this step, the pieces of probe data relating to vehicles starting from the reach area and traveling to the start area are extracted to calculate the power consumption in the homeward travel.

Next, the energy consumption calculator 25 calculates the power consumption from the reach area to the start area, that is the power consumption in the homeward travel, by using the extracted pieces of probe data. As a specific method of calculating the power consumption in the homeward travel, the energy consumption calculator 25 only needs to calculate the power consumption as in the case of calculating the power consumption in the outward travel in step S30. Note that the energy consumption calculator 25 calculates the power consumption in the homeward travel only for the reach areas the outward travel to which consumes power equal to or less than a predetermined value. For example, regarding the reach areas the outward travel to which consumes power equal to or more than 60% of the power in the fully-charge state, the round travel to such areas is impossible and the power consumption in the homeward travel is thus not calculated to reduce the computation amount.

In step S34, the energy consumption calculator 25 calculates the power consumption in the round travel by adding up the power consumption in the outward travel calculated in step S30 and the power consumption in the homeward travel calculated in step S32.

Thereafter, in step S40, the energy consumption calculator 25 determines whether the power consumption in the round travel is calculated for all reach areas. Then, when the power consumption is calculated for all reach areas, the processing proceeds to step S50 to present the information to the user, and the vehicle reach area presentation processing according to the second embodiment is terminated.

As described above in detail, the vehicle reach area presentation device 7 according to one or more embodiments of the present invention calculates the power consumption in the round travel by calculating the power consumption from each reach area to the start area and adding up the resultant value and the power consumption from the start area to the reach area. Information indicating whether the vehicle can make a round travel to the destination can be thus presented to the user, thereby improving the usability of the user.

Moreover, since the vehicle reach area presentation device 7 according to one or more embodiments of the present invention calculates the power consumption in the round travel only for the reach area the power consumption to which from the start area is equal to or less than the predetermined value, the computation amount can be reduced.

Third Embodiment

Next, a vehicle reach area presentation device according to a third embodiment of the present invention is described with reference to the drawings. Note that similar configuration elements as those in the first and second embodiments are denoted by the same reference numerals and detailed description thereof is omitted.

(Configuration of Vehicle Reach Area Presentation System)

Figure 7:
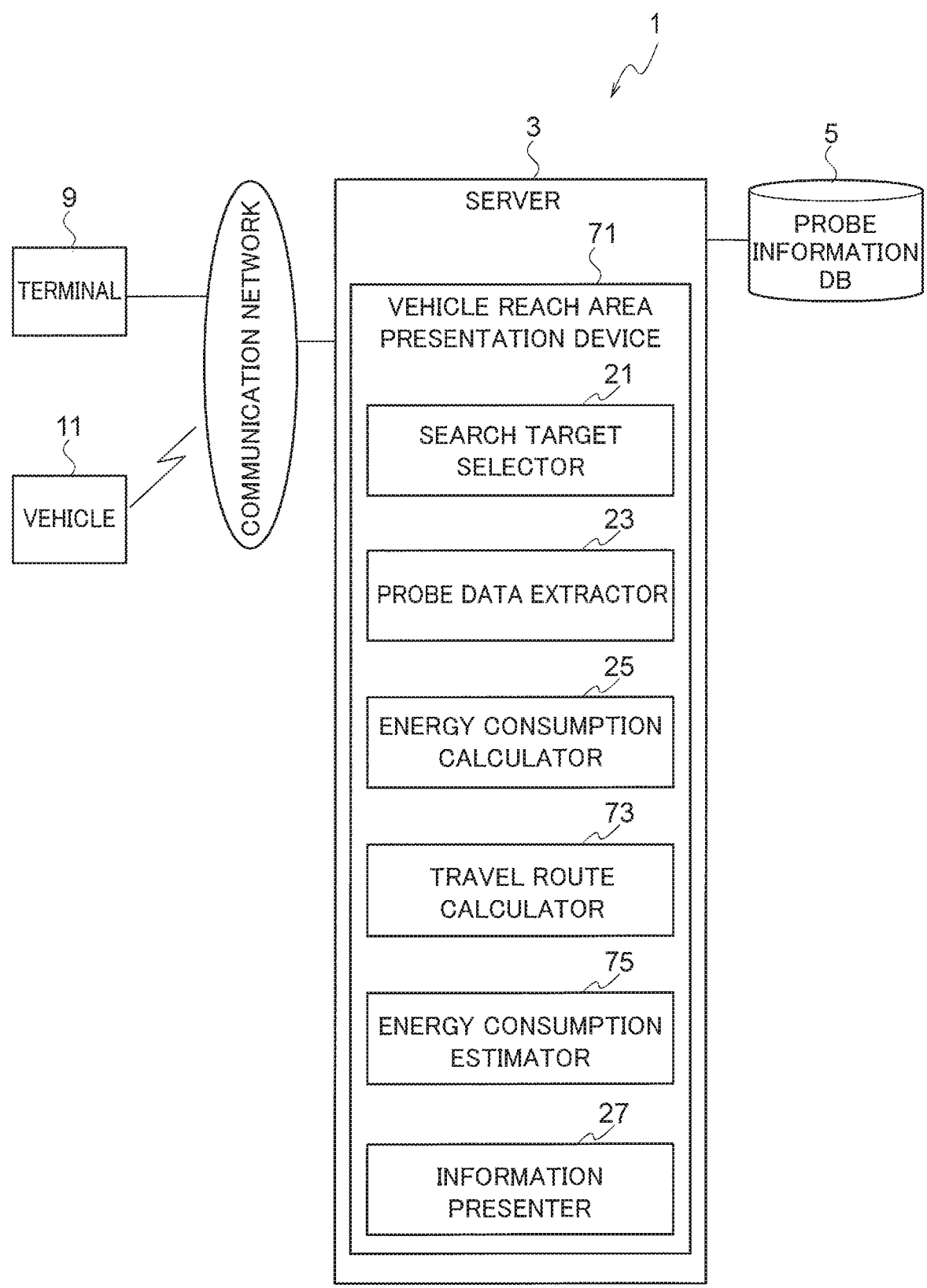
FIG. 7 is a block diagram illustrating a configuration of a vehicle reach area presentation system according to a third embodiment of the present invention.

FIG. 7 is a block diagram illustrating a configuration of a vehicle reach area presentation system including a vehicle reach area presentation device according to this third embodiment. As illustrated in FIG. 7, the third embodiment is different from the first and second embodiments in that a vehicle reach area presentation system 71 according to the third embodiment further includes a travel route calculator 73 and an energy consumption estimator 75.

The travel route calculator 73 calculates travel routes from the start point to each of the goal points which are recorded in the pieces of probe data extracted by the probe data extractor 23. Moreover, the travel route calculator 73 selects a travel route which has been most frequently traveled among the calculated travel routes, as a representative travel route.

The energy consumption estimator 75 sets unit areas through which the travel routes calculated by the travel route calculator 73 pass and for which no travel record is recorded, as passing areas, and estimates the power consumption to each passing area.

Moreover, the information presenter 27 presents the reach areas to the user while changing the display of the reach areas and also presents the passing areas to the user while changing the display of the passing areas depending on the power consumptions estimated by the energy consumption estimator 75. Furthermore, the information presenter 27 displays the travel routes calculated by the travel route calculator 73.

(Steps of Vehicle Reach Area Presentation Processing)

Next, steps of vehicle reach area presentation processing according to the third embodiment are described with reference to the flowchart of FIG. 8. This third embodiment is different from the first embodiment in that step S36 is added to calculate the travel routes from the start point and each goal point and steps S42, S44 are added to estimate the power consumptions to the passing areas. Note that, since the steps other than the added steps S36, S42, S44 are similar to the first embodiment described in FIG. 2, detailed description thereof is omitted.

Figure 8:
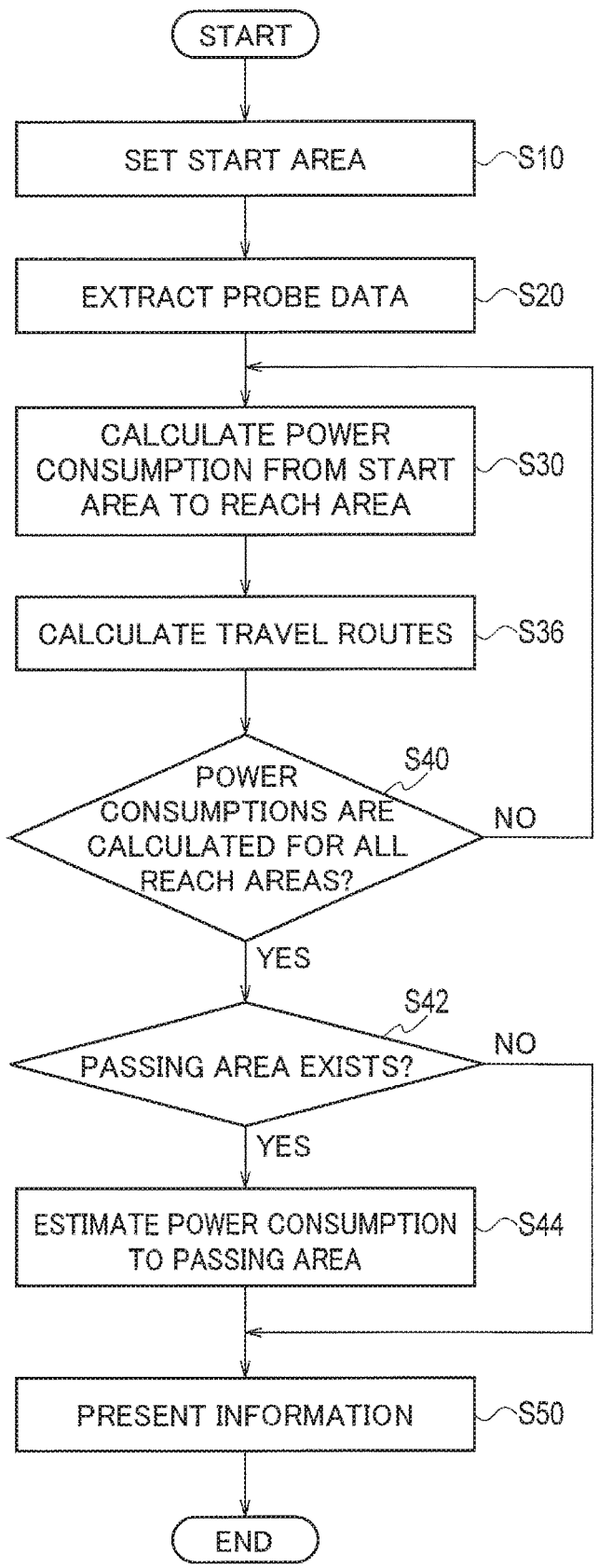
FIG. 8 is a flowchart illustrating processing steps in vehicle reach area presentation processing performed by a vehicle reach area presentation device according to the third embodiment of the present invention.

As illustrated in FIG. 8, after the power consumption from the start area to each reach area is calculated in step S30, the processing proceeds to step S36. In step S36, the travel route calculator 73 calculates the travel routes from the start point to each goal point. The travel route calculator 73 calculates the travel routes by using the point sequence data in the pieces of probe data. The point sequence data is, as described in the first embodiment, the data of the vehicle obtained every predetermined time, for example, every 30 seconds, and is obtained at each time point tn during the travel from the start point Ts to the goal point Tg as illustrated in FIG. 3.

Since the point sequence data is expressed as $$Dtn = \{\text{time } tn, \text{latitude-longitude } tn, \text{travel distance } tn, \text{power consumption } tn\},$$

the position (latitude, longitude) of the vehicle at each time point tn is recorded in the point sequence data. Accordingly, the travel route calculator 73 can calculate the travel route of the vehicle by matching the latitude and longitude in the point sequence data with the map data. Then, the travel route calculator 73 selects the travel route which has been most frequently traveled among the calculated travel routes, as the representative travel route.

Thereafter, in step S40, when the energy consumption calculator 25 determines that the power consumption is calculated for all reach areas, the processing proceeds to step S42. Note that the travel routes are calculated for the reach areas the power consumptions to which are calculated in step S30, at the same time in step S36. Accordingly, if the power consumption is calculated for all reach areas, the travel routes are calculated for all reach areas.

In step S42, the energy consumption estimator 75 determines whether there is the passing area. The passing area is a unit area through which any of the travel routes calculated in the step S36 passes and for which no travel record is recorded. For example, as illustrated FIG. 9, a piece of probe data b5 has the start point in a unit area D and the goal point in a unit area B and a travel route R is calculated. In this case, the travel route R passes the unit areas D, Y, X, and B in this order. Since the goal points are recorded as the travel records in the unit areas B and D, the areas detected as the passing areas are X and Y. Note that, when there are multiple travel routes, the energy consumption estimator 75 may detect the passing areas of all travel routes, or may detect the passing areas of only the representative travel route to reduce the computation amount. The energy consumption estimator 75 thereby determines presence or absence of the passing area and, when the passing area is present, detects the passing area and the processing proceeds to step S44. When the passing area is absent, the processing proceeds to step S50.

In step S44, the energy consumption estimator 75 estimates the power consumption to each of the detected passing areas. Specifically, as a method of estimating the power consumption to each passing area, a positional percentage of the passing area between the start area and the reach area is obtained and the power consumption from the start area to the reach area is multiplied by the positional percentage to obtain the power consumption to the passing area. For example, when the passing area is located in the middle of the start area and the reach area, the positional percentage of the passing area is 50%. Accordingly, the power consumption from the start area to the reach area is multiplied by 50% and the resultant value is set as the power consumption to the passing area.

Figure 9:
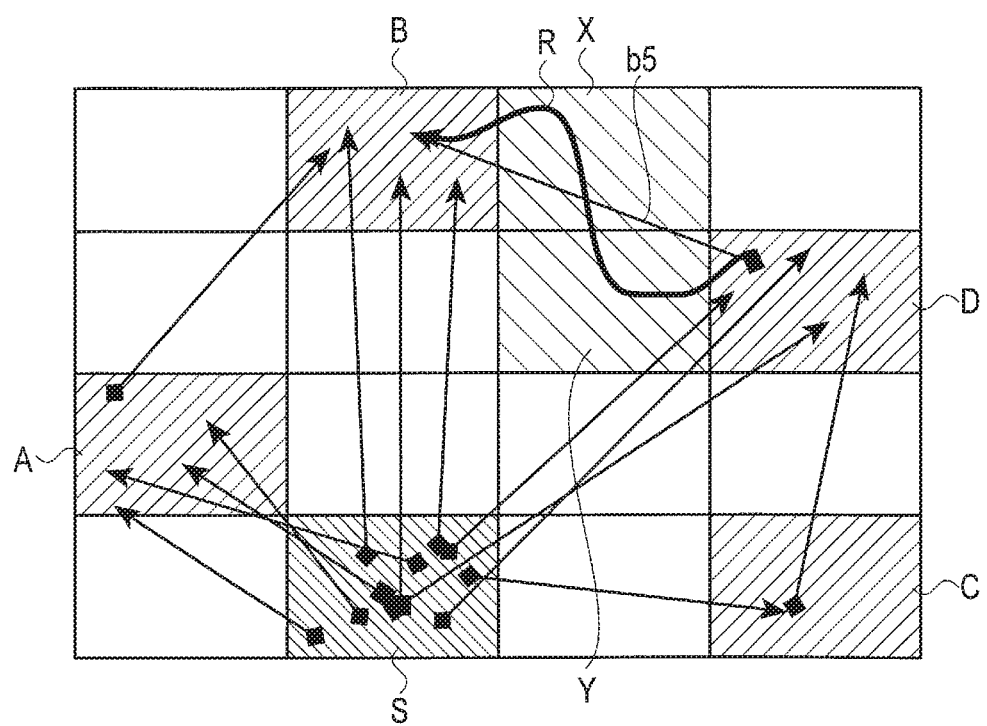
FIG. 9 is a view for explaining a method of calculating an energy consumption performed by the vehicle reach area presentation device according to the third embodiment of the present invention.

Moreover, when the reach area is adjacent to the passing area, the power consumption to the passing area can be estimated depending on the power consumption to the adjacent reach area. For example, when the reach area B is adjacent to the passing area X as illustrated in FIG. 9, the power consumption to the reach area B is set as the power consumption to the passing area X. Moreover, when multiple reaching areas are adjacent to the passing area, the highest one of the power consumptions to the multiple reaching areas may be set as the power consumption to the passing area or an average of the power consumptions to the multiple reaching areas may be set as the power consumption to the passing area. After the power consumption to each passing area is thus estimated, the processing proceeds to step S50.

In step S50, the information presenter 27 presents the reach areas to the user while changing the display of the reach areas depending on the power consumptions calculated in step S30. Moreover, when there are the passing areas, the information presenter 27 presents the passing areas to the user while changing the display of the passing areas depending on the power consumptions estimated in step S44. The method of displaying the reach areas and the passing areas can be similar to the first embodiment.

Moreover, the information presenter 27 also displays the travel routes calculated in step S36. In this case, all of the calculated travel routes or only the representative travel route may be displayed. Specifically, when there are many calculated travel routes and the display thereof is difficult to view, only the representative travel route is displayed.

Figure 10:
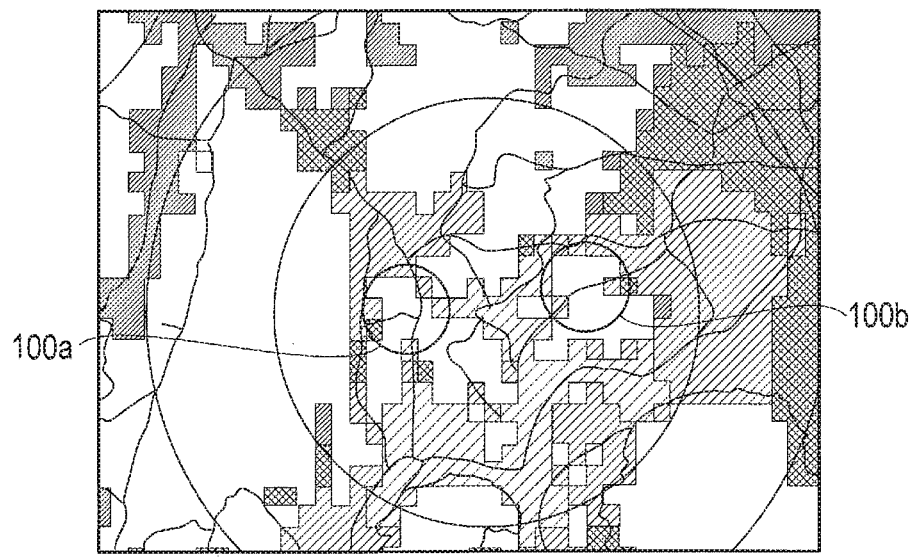
FIGS. 10(a)-10(b) illustrate an example of display presented by the vehicle reach area presentation device according to the third embodiment of the present invention.
Figure 10:
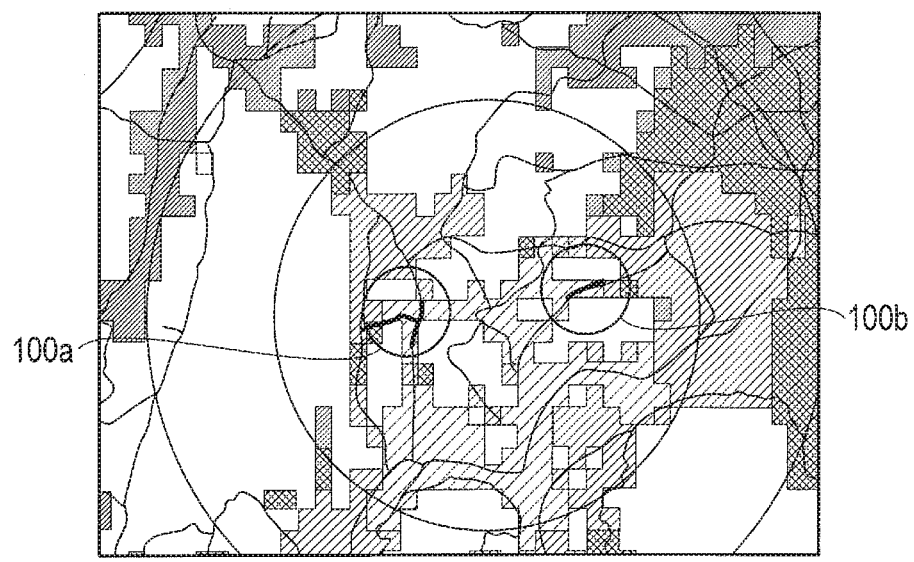

A difference between the display in the first embodiment and the display in the third embodiment is described. In the aforementioned first embodiment, the information presenter 27 color codes and displays only the reached areas and does not color code the unit areas in which no goal points are recorded as the travel records. For example, as illustrated in FIG. 10(a), although the travel routes pass through the portions denoted by 100a and 100b, in these portions, the unit areas are not color coded since they include no goal points.

Meanwhile, in the third embodiment, the information presenter 27 color codes and displays the passing areas. Accordingly, as illustrated in FIG. 10(b), in the portions denoted by 100a and 100b, the travel routes are displayed and the passing areas are color coded depending on the estimated power consumptions. This can reduce the number of display areas on the map which are not color coded. Specifically, this can eliminate a portion where the reach areas are displayed like floating islands.

When the information is displayed on the display screen of the terminal 9 or the display panel of the vehicle 11 and presented to the user as described above, the vehicle reach area presentation processing according to the third embodiment is terminated. Note that, although the case where the power consumptions in one-way travels are calculated is described in the third embodiment, this third embodiment can be applied to the case where the power consumptions in round travels are calculated as described in the second embodiment.

As described above in detail, the vehicle reach area presentation device 71 according to one or more embodiments of the present invention calculates the travel routes from the start point to the goal points recorded in the pieces of probe data and estimates the power consumptions to the passing areas through which the travel routes pass and for which no travel records are recorded. Then, the vehicle reach area presentation device 71 presents the passing areas to the user while changing the display of the passing areas depending on the estimated power consumptions. This enables display of not only the reach areas but also the passing areas. Accordingly, it is possible to reduce the number of not-displayed areas, and provide a high level of reassurance to the user.

Moreover, the vehicle reach area presentation device 71 according to one or more embodiments of the present invention estimates the power consumption to each passing area by obtaining the positional percentage of the passing area between the start area and the reach area and multiplying the power consumption from the start area to the reach area by the positional percentage. The power consumption is thereby estimated depending on the location of the passing area between the start area and the reach area, and the power consumption can be thus estimated accurately in a simple method.

Furthermore, when the reach area is adjacent to the passing area, the vehicle reach area presentation device 71 according to one or more embodiments of the present invention estimates the power consumption to the passing area depending on the power consumption to the adjacent reach area. This facilitates estimation of the power consumption to the passing area.

Moreover, since the vehicle reach area presentation device 71 according to one or more embodiments of the present invention displays the travel routes calculated by the travel route calculator 73, it is possible to present information on travel routes used by the users.

Furthermore, the vehicle reach area presentation device 71 according to one or more embodiments of the present invention selects the travel route which has been most frequently traveled among the calculated travel routes, as the representative travel route. Thus, the power consumption for only the representative travel route has to be estimated when many travel routes are calculated, and the computation amount can be thereby reduced.

Note that the aforementioned embodiments are examples of the present invention. Hence, the present invention is not limited to the aforementioned embodiments. Embodiments other than those described above are possible and various changes depending on a design or the like can be made within the scope not departing from the technical idea of the present invention as a matter of course. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 vehicle reach area presentation system
3 server
5 probe information database
7, 71 vehicle reach area presentation device
9 terminal
11 vehicle
21 search target selector
23 probe data extractor
25 energy consumption calculator
27 information presenter
73 travel route calculator
75 energy consumption estimator

The invention claimed is:

1. A vehicle reach area presentation device that is a server, comprising:
a memory on which map data is stored; and
a controller coupled to the memory and configured to:
divide a region on the map data into predetermined unit areas;
obtain a start point of a vehicle, set a unit area in which the start point exists as a start area, and extract pieces of probe data including records of past travels by vehicles other than the vehicle of the obtained start point within a certain range from the start area;
set the unit areas including goal points recorded in the extracted pieces of probe data as reach areas and calculate energy consumptions from the start area to the reach areas by using the pieces of probe data; and
output data including a displayable map with areas reachable by the vehicle of the obtained start point by the map indicated to a terminal or the vehicle while changing display of the reach areas depending on the calculated energy consumptions.

2. The vehicle reach area presentation device according to claim 1, wherein the controller calculates an energy consumption from the start area to each of the reach areas by using only a piece of the probe data of a past travel from the start area to the reach area.

3. The vehicle reach area presentation device according to claim 1, wherein the controller calculates an energy consumption from the start area to each of the reach areas by connecting the pieces of probe data relating to a same user from the start area to the reach area.

4. The vehicle reach area presentation device according to claim 3, wherein the controller does not connect the pieces of probe data upon a distance from the start area to the reach area calculated by using the pieces of probe data being longer than a linear distance from the start area to the reach area by a predetermined distance or more.

5. The vehicle reach area presentation device according to claim 1, wherein the controller calculates an energy consumption from the start area to each of the reach areas by connecting the pieces of probe data relating to a plurality of users from the start area to the reach area.

6. The vehicle reach area presentation device according to claim 1,
wherein the controller is further configured to:
obtain characteristic information indicating characteristics of a user and a user vehicle registered by the user from the pieces of probe data and select a user and a vehicle having characteristics similar to the characteristics of the characteristic information as a search target, and
extract only the pieces of probe data relating to the user and the vehicle selected as the search target.

7. The vehicle reach area presentation device according to claim 1, wherein the controller extracts the pieces of probe data matching a condition relating to a travel environment and set by a user.

8. The vehicle reach area presentation device according to claim 1, wherein the controller changes the display of the reach areas depending on a state of the vehicle of a user registered by the user.

9. The vehicle reach area presentation device according to claim 1, wherein the controller calculates an energy consumption in a round travel between the start area and each of the reach areas by calculating an energy consumption from the reach area to the start area and adding up an energy consumption from the start area to the reach area and the energy consumption from the reach area to the start area.

10. The vehicle reach area presentation device according to claim 9, wherein the controller calculates the energy consumptions in the round travels only for the reach areas, the energy consumptions to which from the start area are equal to or lower than a predetermined value.

11. The vehicle reach area presentation device according to claim 1,
wherein the controller is further configured to:
calculate a travel route from the start point to a goal point recorded in each of the extracted pieces of probe data;
set, as a passing area, the unit area through which the calculated travel route passes and for which no travel record is recorded and estimate an energy consumption to the passing area, and
output the data including the displayable map with the areas reachable by the vehicle of the obtained start point by the map indicated to the terminal or the vehicle while changing display of the passing area depending on the estimated energy consumption.

12. The vehicle reach area presentation device according to claim 11, wherein the controller estimates the energy consumption to the passing area by obtaining a positional percentage of the passing area between the start area and the reach area and multiplying the energy consumption from the start area to the reach area by the positional percentage.

13. The vehicle reach area presentation device according to claim 11, wherein, upon the reach area being adjacent to the passing area, the controller estimates the energy consumption to the passing area depending on the energy consumption to the adjacent reach area.

14. The vehicle reach area presentation device according to claim 11, wherein the controller displays the calculated travel route.

15. The vehicle reach area presentation device according to claim 11, wherein the controller selects the travel route having been most frequently traveled among the calculated travel routes, as a representative travel route.

16. The vehicle reach area presentation device according to claim 1, wherein the predetermined unit areas are in a mesh pattern.

17. The vehicle reach area presentation device according to claim 1, wherein at least one of the reach areas has no side in contact with the sides of the start area.

18. The vehicle reach area presentation device according to claim 1, wherein the controller presents the data including the displayable map with the areas reachable by the vehicle of the obtained start point by the map indicated to the terminal or the vehicle while changing display of the reach areas depending on the calculated energy consumptions.

19. A vehicle reach area presentation method, comprising:
dividing, by a controller of a server, a region on a map data into predetermined unit areas;
obtaining, by the controller, a start point of a vehicle, setting a unit area in which the start point exists as a start area, and extracting pieces of probe data including records of past travels by vehicles other than the vehicle of the obtained start point within a certain range from the start area;
setting, by the controller, the unit areas, including goal points recorded in the extracted pieces of probe data, as reach areas and calculating energy consumptions from the start area to the reach areas by using the pieces of probe data; and outputting, by the controller, data including a displayable map with areas reachable by the vehicle of the obtained start point by the map indicated to a terminal or the vehicle while changing display of the reach areas depending on the calculated energy consumptions.

20. The vehicle reach area presentation method according to claim 19, further comprising:

presenting, by the controller, the data including the displayable map with the areas reachable by the vehicle of the obtained start point by the map indicated to the terminal or the vehicle while changing display of the reach areas depending on the calculated energy consumptions.

\* \* \* \* \*